C. F. MESSINGER.
NUT TAPPING MACHINE.
APPLICATION FILED MAY 16, 1907.

985,827.

Patented Mar. 7, 1911.
10 SHEETS—SHEET 1.

Fig. 1.

Witnesses:
Inventor:
Charles F. Messinger,
By Cheever & Cox.

C. F. MESSINGER.
NUT TAPPING MACHINE.
APPLICATION FILED MAY 16, 1907.

985,827.

Patented Mar. 7, 1911.
10 SHEETS—SHEET 6.

Witnesses:

Inventor:
Charles F. Messinger
By Cheever & Cox

C. F. MESSINGER.
NUT TAPPING MACHINE.
APPLICATION FILED MAY 16, 1907.

985,827.

Patented Mar. 7, 1911.

UNITED STATES PATENT OFFICE.

CHARLES F. MESSINGER, OF CHICAGO, ILLINOIS, ASSIGNOR TO CHICAGO NUT COMPANY, OF CHICAGO, ILLINOIS, A CORPORATION OF ILLINOIS.

NUT-TAPPING MACHINE.

985,827.   Specification of Letters Patent.   Patented Mar. 7, 1911.

Application filed May 16, 1907. Serial No. 373,915.

*To all whom it may concern:*

Be it known that I, CHARLES F. MESSINGER, a citizen of the United States, residing at Chicago, in the county of Cook and State of Illinois, have invented a certain new and useful Nut-Tapping Machine, of which the following is a specification.

The object of the invention is to provide a machine for tapping or screw threading nut blanks to form them into perfect nuts for use upon bolts.

It consists in a machine for accomplishing this object which will automatically take nut blanks from a receptacle and feed them one at a time in front of a rotating tap designed to form a proper thread inside of the nut and hold each nut in position during the tapping operation, and in means for preventing injury to the machine by nut blanks clogging the passageways leading to the taps and mechanism for holding the nut blanks in front of the taps.

Another important feature of the invention provides means for taking nut blanks from a common receptacle and distributing them automatically to a plurality of tapping mechanisms of the class just described, this more particularly in combination with mechanism for preventing injury to the machine should one or more of the numerous tapping mechanisms or the passageways leading thereto become clogged, and in means to allow the operation of the tapping mechanisms which are in order without it being necessary to stop them all when one of the mechanisms is out of order.

More in detail the invention consists in a novel switching mechanism for distributing nut blanks to the various tapping mechanisms; in mechanism for purposely stopping any one of the tapping mechanisms without interfering with the others, in a novel mechanism for elevating and feeding nut blanks to the switching mechanism, in such an automatic machine which can be easily and comparatively cheaply made and installed, which is efficient in operation and not readily liable to get out of order, and in features or details of construction which will be hereafter described and claimed as the specification proceeds.

Referring to the drawings

In constructing the machine a suitable support, containing among others, the parts 30, 31, 32, 33 and 34 is provided. In the one or more of said uprights 34 (Fig. 16), are as many horizontal tubes 35 as it is designed nuts shall be simultaneously tapped. Through each horizontal tube 35 a top rod 36 terminating in tap proper 37, of the ordinary type passes. These tap rods 36 with the taps upon them are continuously rotated by any suitable well known mechanism (not shown) and the object of the invention is to provide automatic means for carrying nut blanks one at a time in front of each tap 37, to hold each such blank in position and force it upon said tap, or form the screw threads inside the blank and finally release the holding mechanism from each nut and leave it upon the adjacent rod 36 from which the finished nuts thereon may be removed in the manner well known in the art, as each rod 36 becomes filled with finished nuts.

Figure 5:
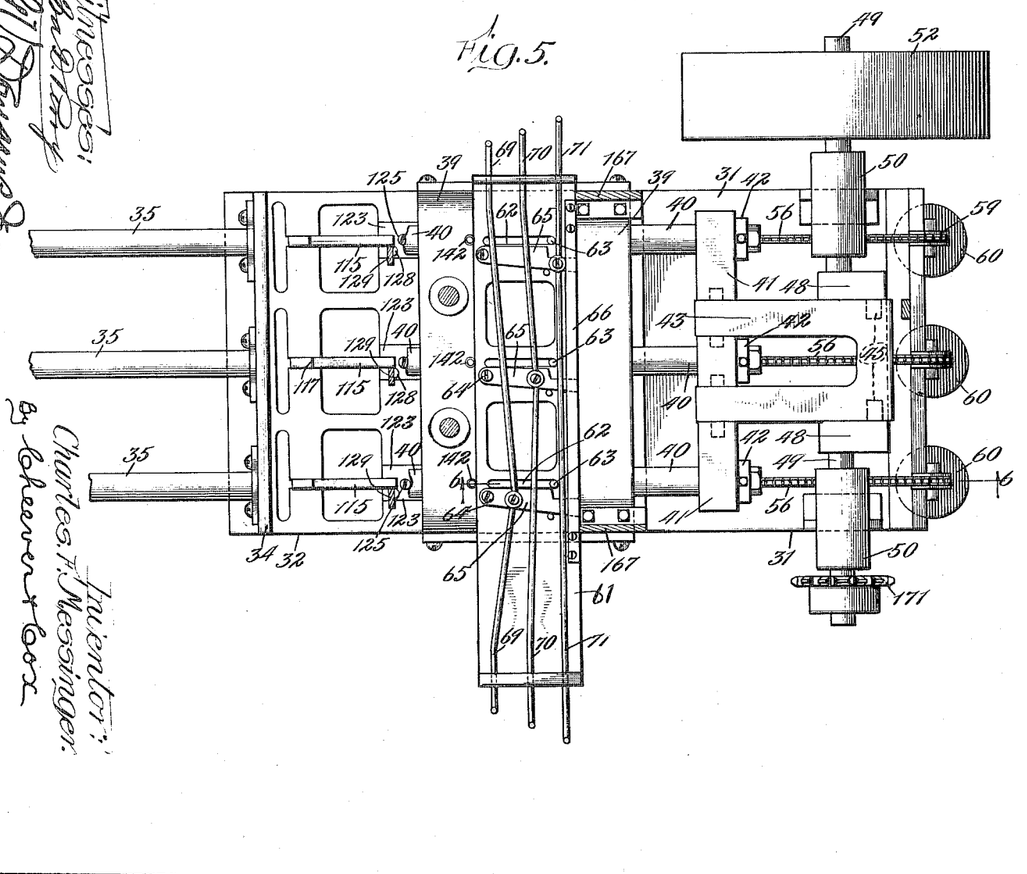
Fig. 5 is a plan view taken on the line 5—5 of Fig. 3.

Slidably mounted in suitable bearings 39 in portions 33 of the frame are parallel longitudinally movable rods 40, one for each tap 37. Slidably mounted on the rear end of these rods 40 is a cross head 41. Rigidly secured to the rear end of each rod 40 is a downwardly extending plate 42. Pivotally mounted upon cross head 41 is a connecting rod 43, in the particular instance here illustrated, made U shaped (Fig. 5). Journaled in the rear end of this connecting rod 43 are two crank pins 45 carried by crank arms 48 on main power shaft 49, journaled in bearings 50. On this shaft 49 is pulley 52 through which power is communicated to the machine from any suitable external source.

Figure 1:
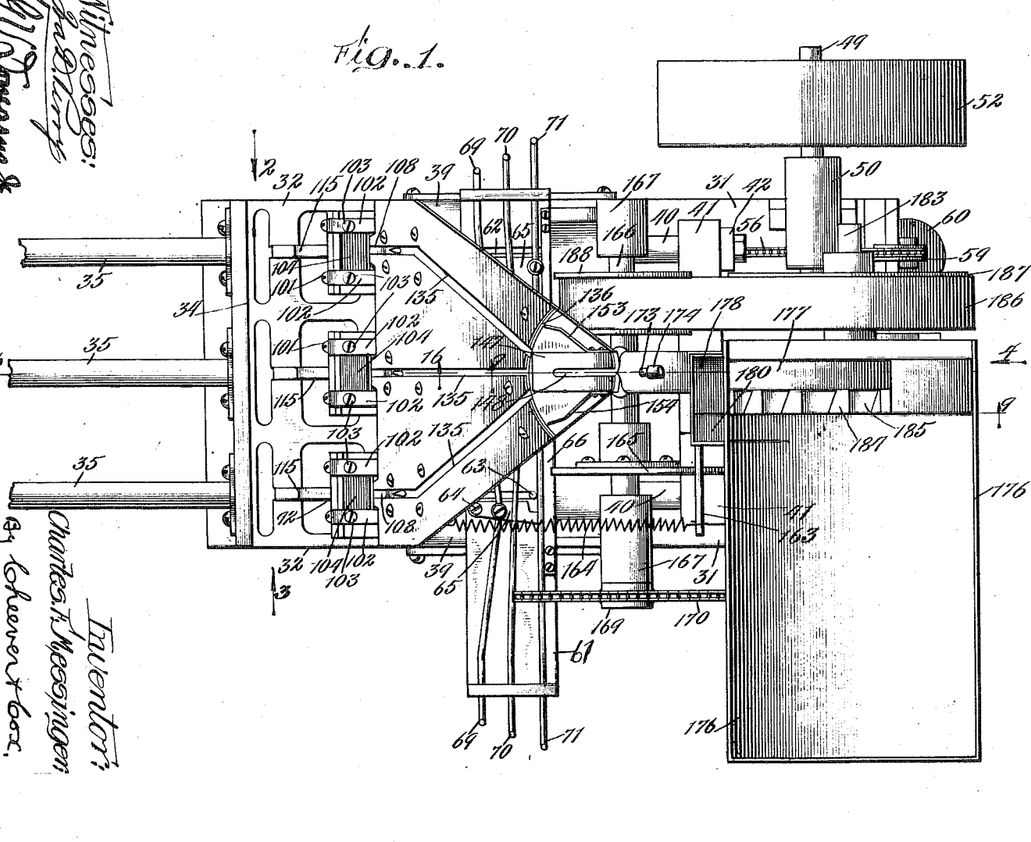
Figure 1 is a plan view of one specific machine embodying the preferred form of the invention.
Figure 2:
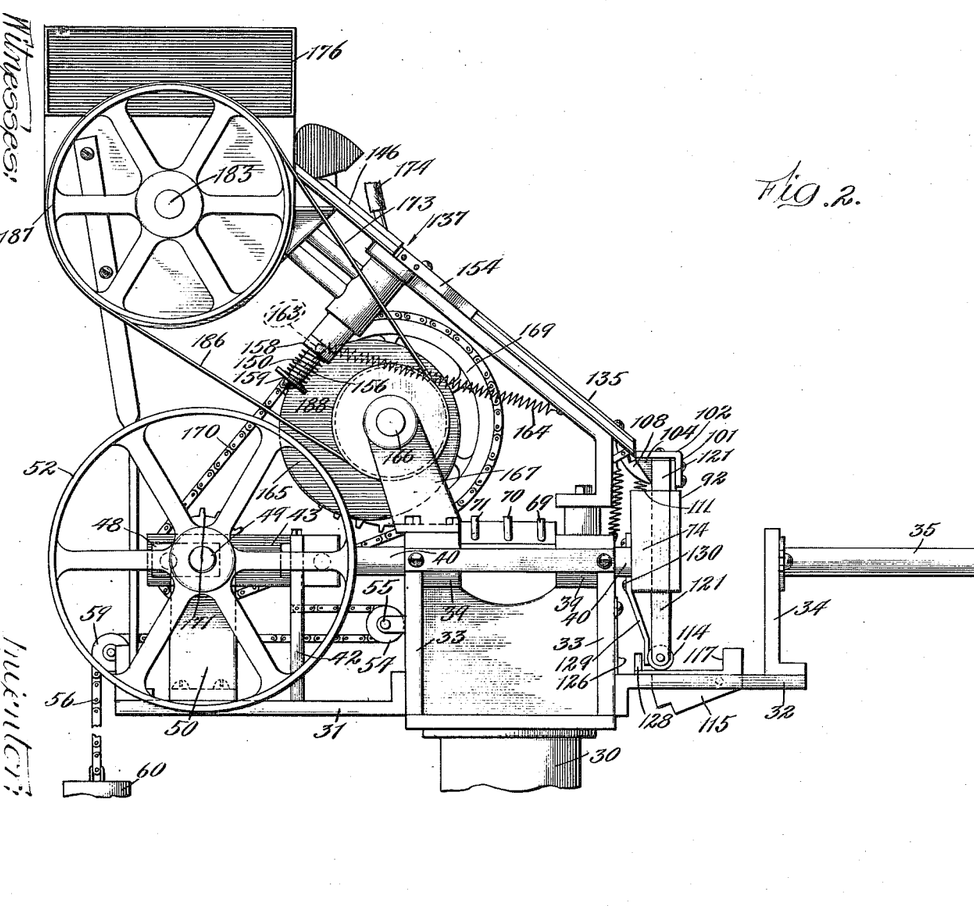
Fig. 2 is a side view of the machine looking at it in the direction of arrow 2 Fig. 1.
Figure 3:
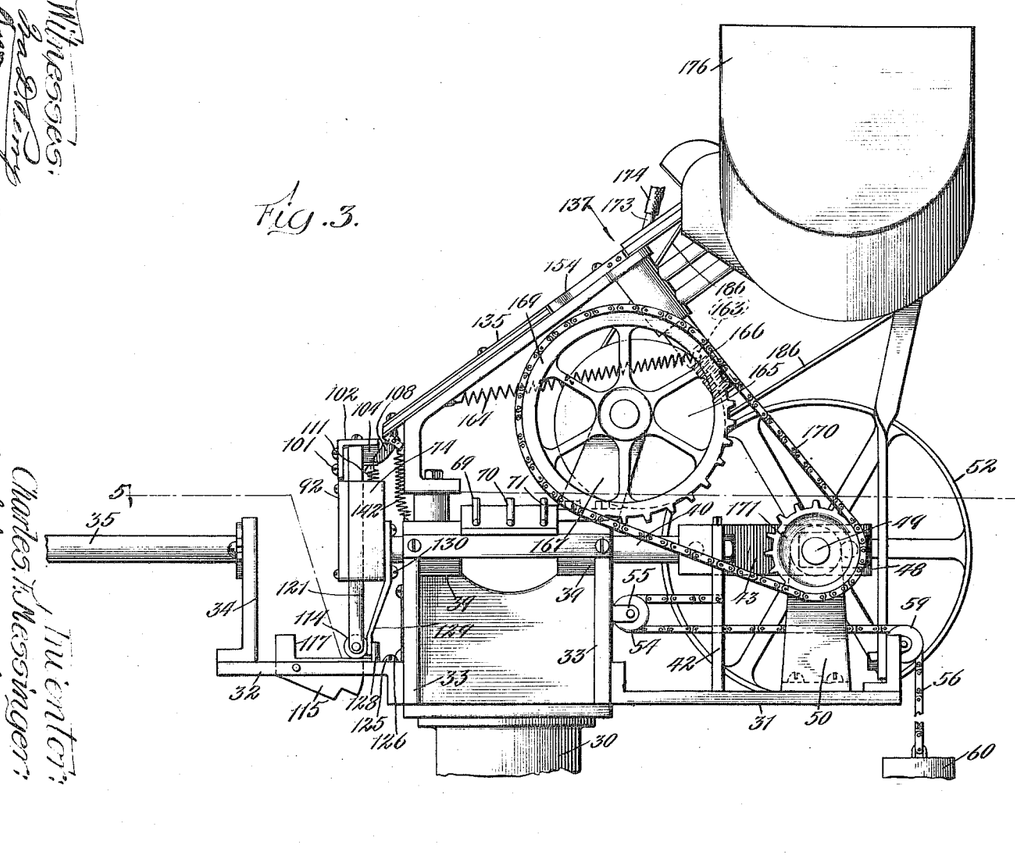
Fig. 3 is a view from the opposite side of the machine in the direction of arrow 3 Fig. 1.
Figure 4:
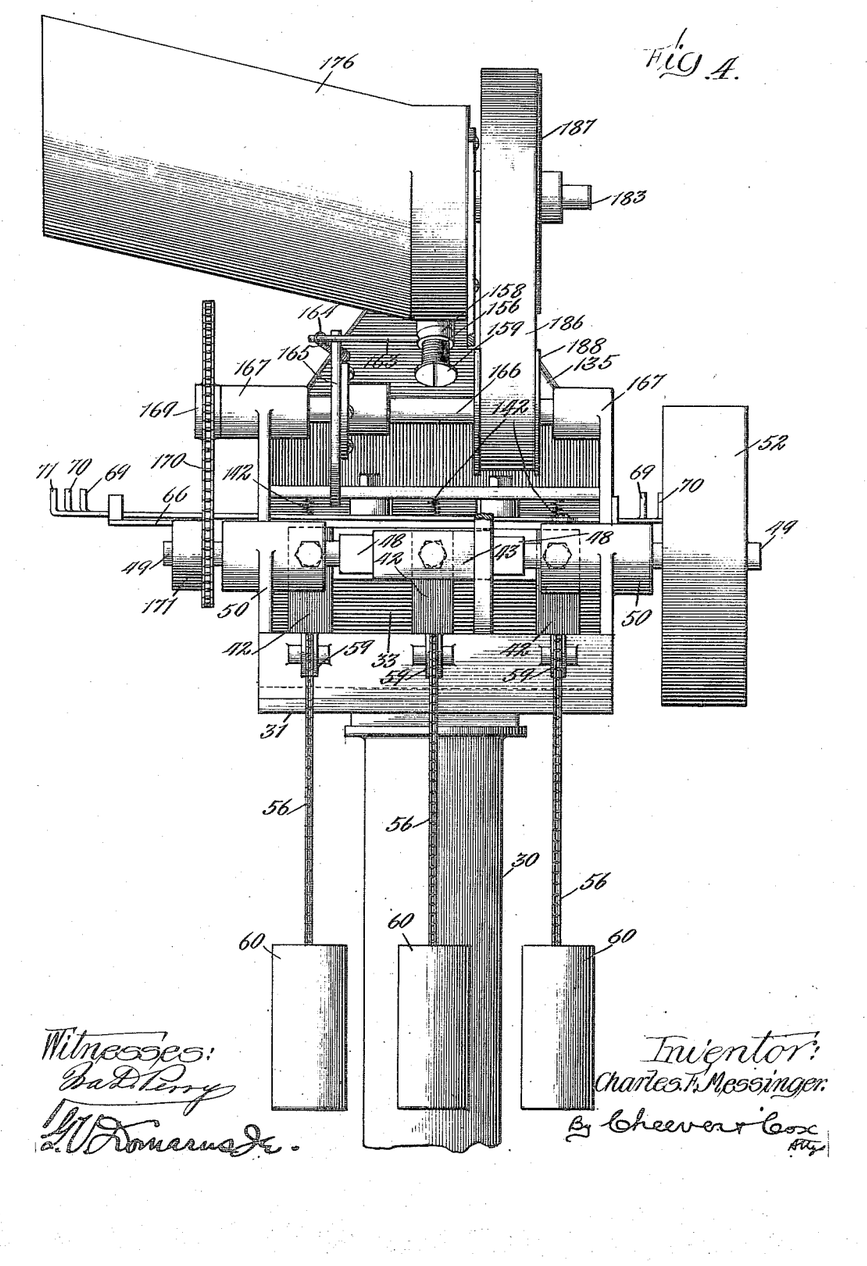
Fig. 4 is a rear view in the direction of arrow 4 Fig. 1.
Figure 6:
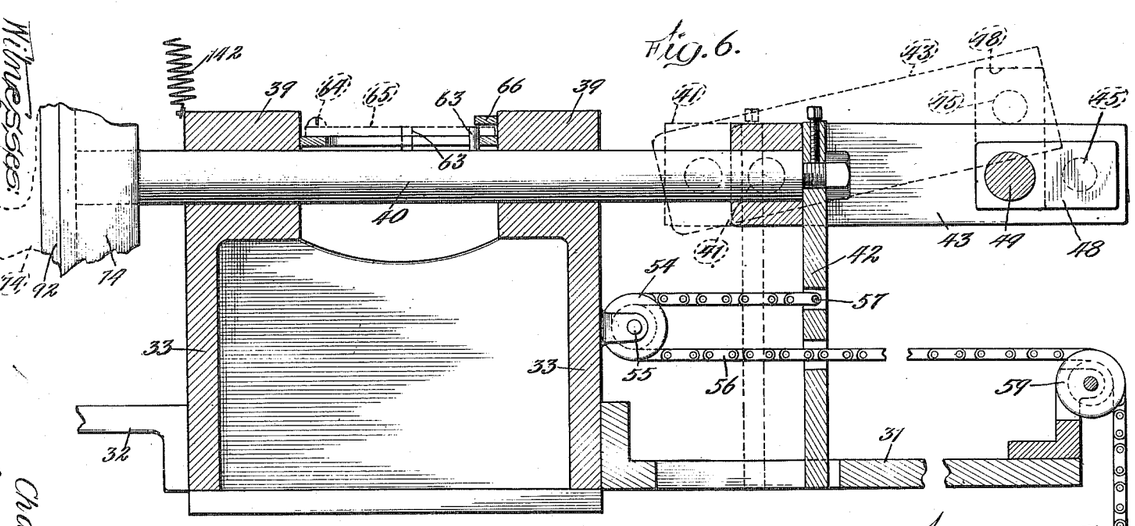
Fig. 6 is a sectional detail view on line 6—6 Fig. 5.
Figure 7:
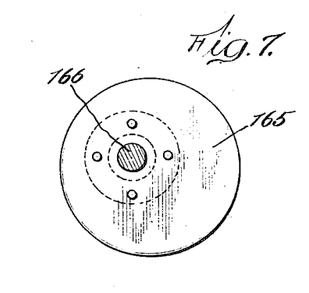
Fig. 7 is a detail view of a cam for operating the switching mechanism.
Figure 8:
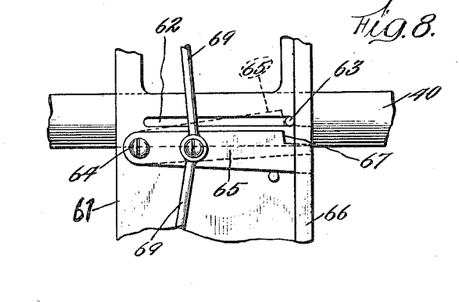
Fig. 8 is a detail plan view of the portion of Fig. 6 directly above it.

On rear frame 33 adjacent to each rod 40 is a small pulley 54 journaled upon a suitable bearing 55. Over each pulley 54 is a chain or other flexible member 56 having one end rigidly secured at 57 to depending member 42 and its other end portion passing over another pulley 59 and connected to a weight 60. Thus each weight 60 tends to move its rod 40 toward the front of the machine or to the left in Fig. 6, while crank pin 45 tends to oppositely move each of said rods 40 whenever the cross head 41 engages the plates 42 but does not affect the movements of the rods 40 at other times. The reason for this construction is that if the mechanism for forcing the nut blanks upon the taps to be hereafter described, carried by the forward ends of rods 40 were power fed upon the taps their rate of travel would have to be accurately timed or breaking of the tap threads would result and this is avoided by so proportioning the parts just described that weights 60 feed rods 40 toward the taps and the crank mechanism returns them to original position when the tapping operation is completed. It is also desirable to be able to stop one of the rods 40 with its nut holding mechanism without interfering with the operation of the other similar mechanisms of the same machine, so each rod 40, slidable in the cross head 41, has provided upon its upper side a pin 63 (Figs. 6 and 8) adapted to travel backward and forward in a slot 62, cut in the table 61, as the rod is reciprocated. At a suitable point 64 adjacent the rod, is pivotally mounted a latch member 65 having its opposite end movable crosswise of the adjacent rod 40 in guides 66, and a latch face 67 adapted to engage said pin 63 when rod 40 has been moved as far as it will go toward the rear of the machine, so that when the latch is thrown over from full line to dotted line position of Fig. 8, it locks pin 63 and attached rod 40 in their extreme rearward position with the result that cross-head 41 is free to move backward and forward along the rod without injury to it, and the weight 60 belonging to that particular rod is powerless to move it as described. Each latch 65 is controlled by a rod 69 or 70 or 71 (Fig. 1) extending to each side of the machine, which the operator may take hold of to move the latch as described.

Figures 19, 20, 21, 22:
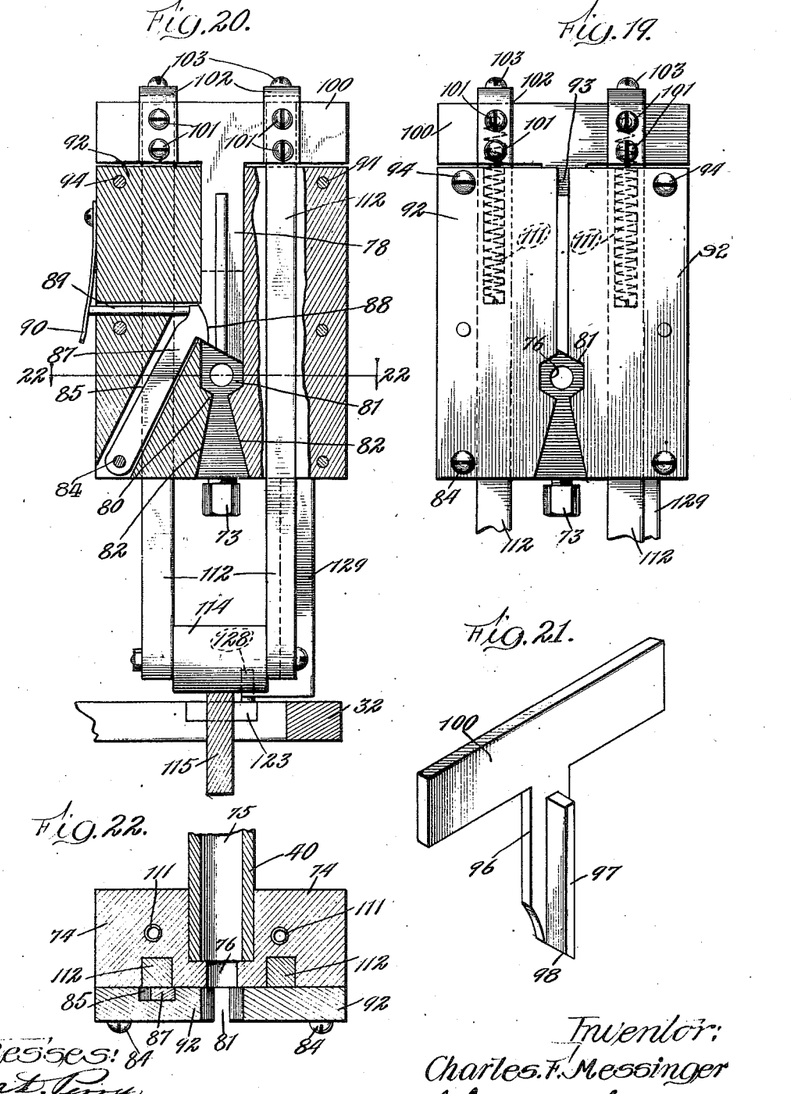
Fig. 19 is a front view of the tapping heads in the direction of the arrows 19 of Fig. 16.
Fig. 20 is a similar view but partly in section.
Fig. 21 is a perspective view of a vertical rod and head operating the same.
Fig. 22 is a plan detail view on the line 22 of Fig. 20.

Rigidly secured to the forward end of each rod 40 by a screw 73, or other suitable means, is a clutch head 74 for supporting the nut blank during the tapping operation. Each rod 40 has a hole 75 in its forward end registering with a hole 76 in head 74 in line with the adjacent tap 37, so that as rod 40 is fed forward, as heretofore described, the rod and attached parts may be carried to a position in which tap 37 is within the rod without injury to the tap. In the central upper portion of head 74 is a recess 79, having an inclined bottom surface 77, connecting with a vertical recess 78 in the face of head 74. This vertical recess or passageway 78 has its walls, below the opening 76, contracted in the angular points 80 so that when a nut blank passes down the chute 77—78 and reaches tapping position, it rests upon said angular points 80 as shown in Fig. 20 with the center of the nut blank 81 in line with the center of the adjacent tap 37. Below these angular points 80 the vertical recess again flares out in the angular lines 82 so that a clear passageway is formed below a nut resting on the angular faces 80 through which shavings formed by the tap may fall. Pivotally mounted at 84 within a suitable recess 85 formed at one side of the head 74 is a latch dog 87 having an angular face 88 extending into the vertical passage 78. This latch dog 87 is normally spring pressed toward the center of the passage 78 by means of rod 89 and spring 90.

Secured upon the face of head 74 proper just described and over the recesses 78 and 85 are face plates 92 spaced along the center line of the recess 78 so as to form a narrower recess or opening 93 in communication with the recess 78. The lower part of recess 93 adjacent to the nut 81 and below said nut corresponds (Fig. 19) with the angular points and inclined surfaces 82. The plates 92 are preferably detachedly secured to the head 74 by screws 94 or other suitable means.

Figures 16, 17:
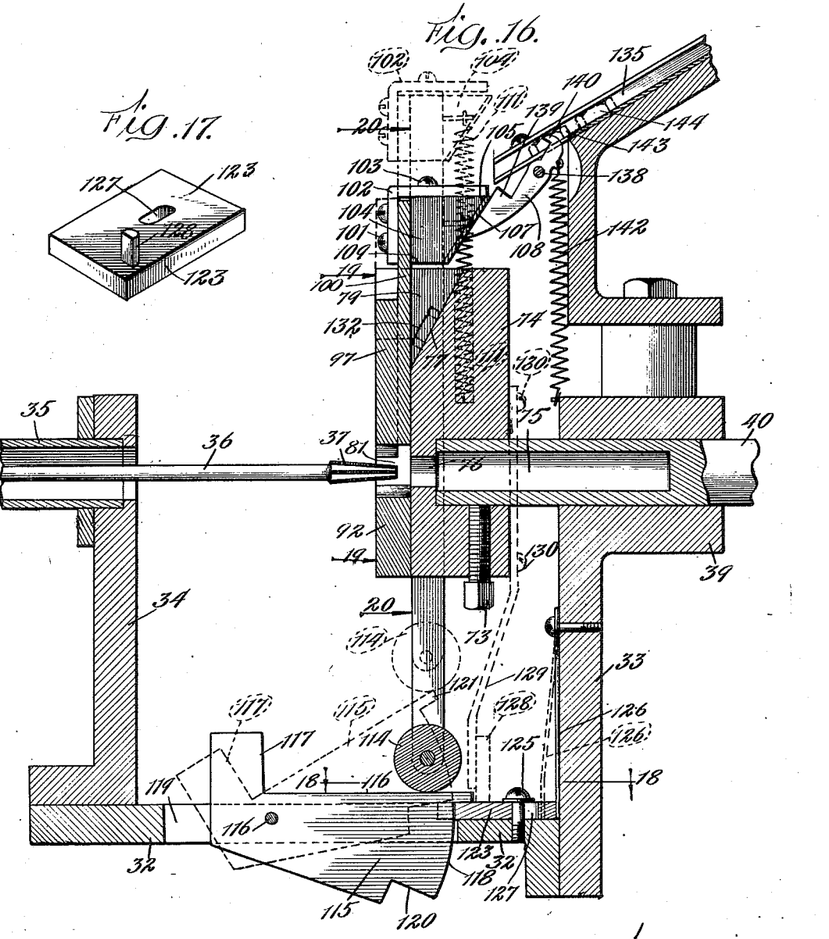
Fig. 16 is a sectional detail view of the tapping head or chuck proper on line 16—16 Fig. 1.
Fig. 17 is a perspective detail view of a locking dog.
Figure 18:
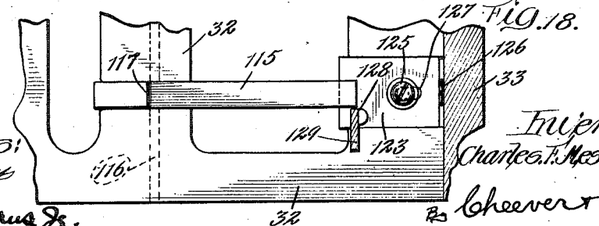
Fig. 18 is a plan view on line 18—18 of Fig. 16.

Slidably mounted in the recess 78 is a vertical plunger 96 having attached thereto a portion 97 slidingly movable in recess 93. The lower end of plunger 96—97 is made with an angular face 98 adapted when the plunger is moved downward to engage a nut blank 81 within the recess 78 and force it against and past the latch face 88 and finally hold it against angular faces 80 in tapping position. The tension of the spring 90 and the shapes of the latch face 88 and plunger face 98 are so adjusted with reference to each other that when the plunger 96—97 is forced downward it causes a nut blank resting against the latch face 88 to turn itself to a predetermined position within the recess 78 and pass down past the latch 88 into engagement with the angular faces 80 and remain there while it is moved into engagement with the adjacent tap 37. The cam mechanism to be hereafter described for controlling the movement of the plungers 96—97 is so timed that the nut blank is not forced past the latch 88 until the mechanism is just ready to begin a tapping operation so that the blank has no chance to fall forward out of the front of the chuck head and escape the tap. This construction is quite important in order to avoid injury to the machine through the nut blank which is to be tapped sticking within the chute or recess 78 or otherwise clogging the machine during the tapping operation. To give the plunger 96—97 such an up and down motion the upper end of the plunger is connected to a cross bar 100 which is secured by screws 101, the angular strap 102 and screws 103 to a hollow box or chute 104 which is open top and bottom and extends crosswise of the adjacent head 74. The rear face 105 of this box 104 is, (Fig. 16), made inclined to engage an inclined face 107 on the lower end of an escapement pawl 108 upon the feed chute 135 which will be hereafter described. This chute 104 with its attached parts is normally held in its lower or full line position (Fig. 16) by retractile springs 111 or any other suitable means, the open bottom of the chute entering the top of recess 79 heretofore described. Rigidly secured to the chute 104 are two vertical rods 112 slidably mounted in suitable recesses within the head 74 said rods carrying at their lower ends a roller 114 adapted to travel upon a cam 115 pivoted to the frame at 116. This cam is L shaped with a normally horizontal face 116 and a vertical face 117. It has a curved edge 118 registering with the edge of a slot 119 cut in the frame portion 32 so that the cam may as best seen in Fig. 16 be tilted up and down through said slot. In the lower portion of the cam adjacent to this curved edge 118 is a notch 120. The upper face 116 of the cam extends beyond said curved surface 118 in the lip or lug 121. Slidably mounted in a suitable recess in the frame portion 32 adjacent to edge 118 of the cam is a latch 123, normally held in the dotted line position of Fig. 16 spring pressed outwardly toward the dotted line position of that figure, to temporarily hold latch 120 and said cam 115 in elevated position when said cam is in the dotted line position of that figure. This latch is therefore mounted upon a pin or screw 125 passing through an elongated slot 127 in the latch into the frame portion 132, and spring pressed outward by the spring 126. Rising from this latch 123 is a pin or lug 128 engageable by a depending member or foot 129 carried by the head 74 at 130. When the parts are in the full line or normal position (Fig. 16) the head 74 is at its lowest position and roller 114 rests upon the flat horizontal surface 116 of the cam 115. When now the mechanism heretofore described begins to move rod 40 and attached chuck 74 forward or to the left of Fig. 16 for the purpose of tapping a nut blank carried by the chuck the roller 114 travels along face 116 of the cam until it strikes face 117 and tilts the cam 115 to the dotted position of Fig. 16. As roller 114 starts forward as just described it manifestly carries with it the depending foot 129 thereby allowing the spring 126 to start to press the latch 123 forward or to the left of Fig. 16 and as soon as the cam 115 is tilted to the dotted line position as just described this latch 123 clicks into the notch 120 and temporarily locks the cam in dotted line position. As this occurs the tapping operation has been completed and the nut carried by the chuck has passed entirely over tap 37 onto rod 36. As rod 40 now begins to move in the opposite direction the wheel 114 begins to travel up the now inclined face 116 of the cam 115 toward the dotted line position of Fig. 16 and carries with it the chute 104 and the plungers 96—97 thus releasing the grip or bite of the plungers on the previously held nut blank and allowing it to remain on the rod 36. As the wheel 114 continues to ascend it carries the plunger 96—97 to a sufficient height as shown so that a nut blank 132, which has preferably fallen through chute 104 to the position in chute 79 where it appears in Fig. 16, may pass into the recess 78 and down against the latch face 88 under the plunger 96—97. This return motion of the rod 40 which has elevated the wheel 114 as just described has also carried the depending foot 129 horizontally backward to the right in Fig. 16 and as the wheel 114 reaches the upper corner of the cam face 116 the foot strikes pin 129 and moves latch 123 to the right against the action of spring 126 until said latch clears the notch 120 when the springs 111 immediately move the plungers 96—97 and the wheel 114 downward to normal position thus simultaneously moving the nut blank 132 to proper position for tapping and returning the cam 115 to full line position of Fig. 16 in which position it remains while the particular nut blank which was brought down from position 132 to position 81 is being tapped and until in that operation the wheel 114 again strikes cam face 117 when the operation is repeated.

Figures 9, 10, 11:
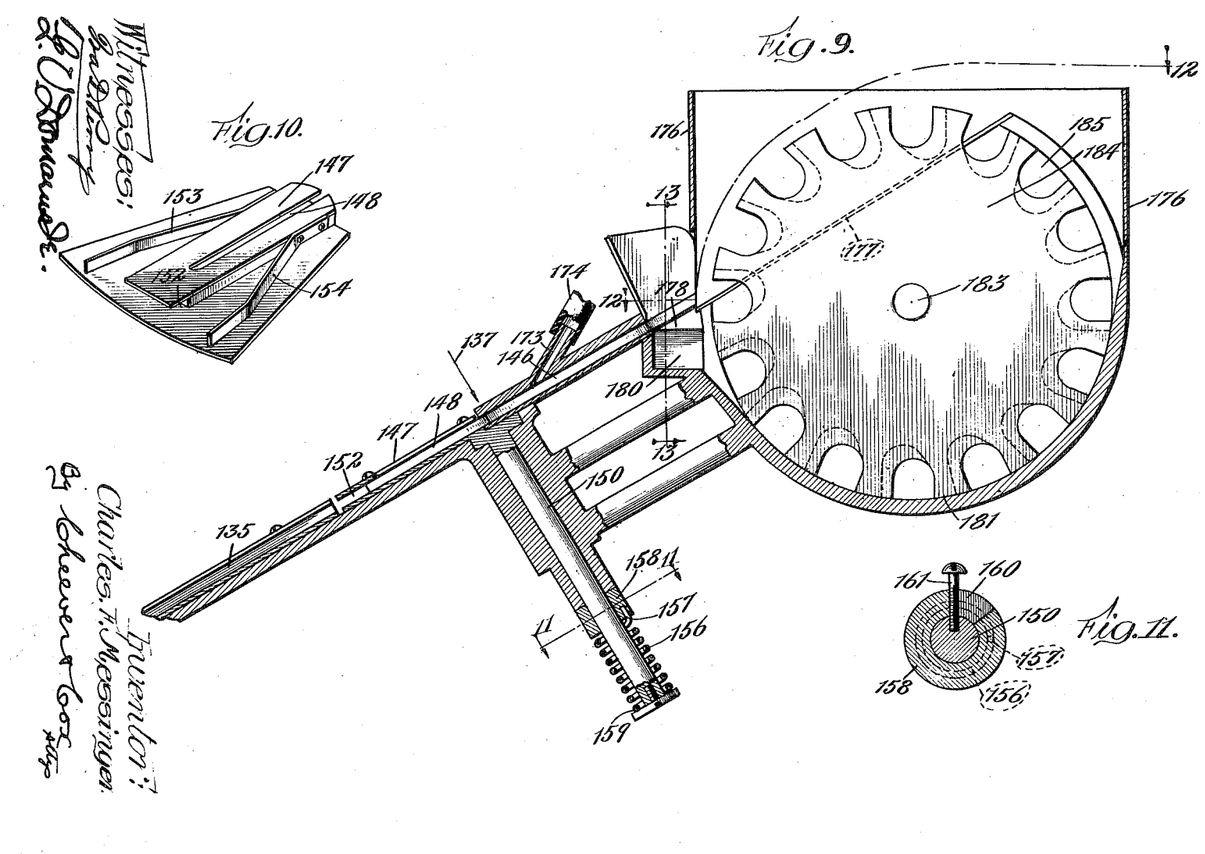
Fig. 9 is a sectional detail view on line 9—9 Fig. 1.
Fig. 10 is a perspective view of the switch mechanism.
Fig. 11 is a sectional detail view on line 11—11 of Fig. 9.
Figures 12, 13, 14, 15:
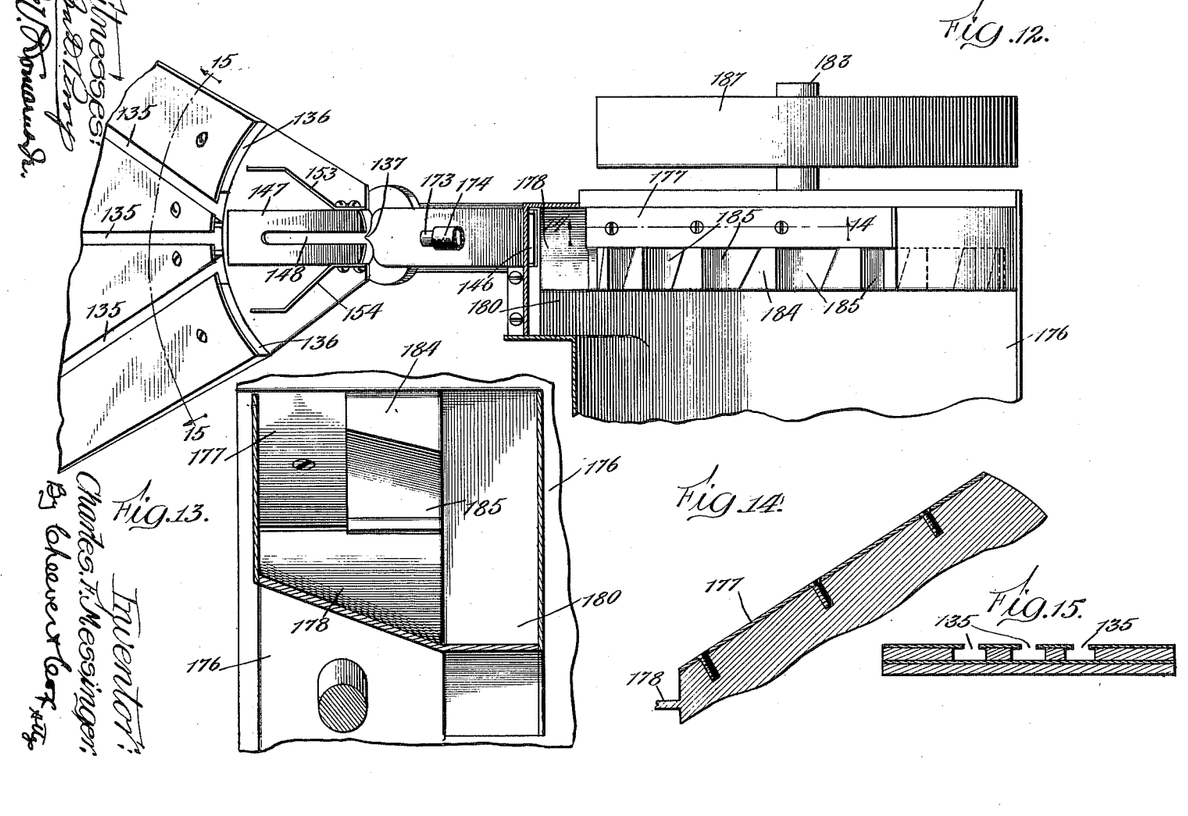
Fig. 12 is a plan detail view partially in section taken on the line 12—12 of Fig. 9.
Fig. 13 is a partial sectional detail view on line 13—13 Fig. 9.
Fig. 14 is a sectional view on line 14—14 Fig. 12.
Fig. 15 is a sectional detail view of the feed chutes on the curved line 15—15 Fig. 12.

To deliver nut blanks from a common source to the mechanism just described each tapping mechanism has a downwardly inclined feed chute or track 135 having an interior cross section (Fig. 12) shaped to allow a nut blank to slide therein and the upper ends of the chutes approach each other in a curved surface 136 in the arc of a circle (Fig. 12) drawn about a central axis 137 and the lower end of each chute 135 terminates directly over the nut chute 104—79—78. Each chute 135 is provided with independent mechanism for delivering nut blanks to its tapping mechanism. Pivotally mounted at 138 adjacent to the lower end of each chute 135 is an escapement dog 108 heretofore referred to, having two teeth 139 and 140. This escapement is normally pressed by spring 142 toward a position where the lower tooth 139 closes the end of chute 135 but when the chute 104 is in the full line position of Fig. 16 it tilts the escapement 108 against the action of spring 142 and allows the last nut in the chute 135 to fall downward into the position of nut 132. In this position the next adjoining nut 143 is engaged by the dog 140 and held with all the nuts behind it in the chute 145. When the wheel 114 and attached parts is elevated in the manner described chute 104 releases the end 107 of the escapement 108 and allows nut 143 to slip down against tooth 139 of the escapement, which now closes the end of the chute 135, while another nut blank 144 passes to the position occupied by 143 in Fig. 16. As the parts return to normal position again and the escapement 108 is depressed by chute 104, nut 143 drops down to the position of nut 142 and tooth 140 enters the center of nut 144 thus holding it as nut 143 is held in Fig. 16. In other words each time the chute 104 descends it causes one nut blank and only one to escape from the chute 135 and fall down to position 132 ready to be forced down to tapping position on the next succeeding descent of the chute 104 with attached plungers 96—97.
Adjacent to the curved track 136 and on the opposite side of axis 137 is a nut track or chute 146. Between this chute 146 and the ends of chutes 135, terminating in surface 136, is a switching mechanism for delivering nuts from said chute 146 to the various chutes 135 as and when needed. This mechanism consists in a switching member 147, containing a chute 148 pivotally mounted in the plane of the chute 146 and of the chutes 135, always registering with chute 146 and adapted to register as desired with any one of the chutes 135, so that rotating shaft 150 to which said switching member is secured will oscillate the lower end of the switch 147 adjacent to or along the arc 136 with the result that nut blanks passing down the chute 146 through the chute passageway 148 pass into the adjacent chute 135 and then down to the tapping mechanism. To prevent accidents to the machine due to clogging of the nut blanks at this point, the side walls of the chute proper adjacent to the upper ends of the chutes 135 are cut away in the openings 152 and there are provided upon the side of the chute spring members 153 and 154 of such a length that their ends approximately graze the curved surface 136 with the result that these spring members act as brooms to carry nut blanks which come down the chute 148 and pass out through the openings 152 onto the surface 136, backward and forward along said surface, as the chute member 147 is oscillated, until said nut blanks finally find one of the chutes 135 which is not already filled with nut blanks so that they may pass into it toward the tapping mechanism. To oscillate this shaft 150 with attached parts and at the same time prevent injury to the machine should the nut blanks adjacent to the curved surface 136 become so clogged that the switching mechanism cannot be operated (a situation likely to occur) the lower end of the shaft 150 carries a coiled spring 156 having one end rigidly secured at 157 to a collar 158 loosely mounted upon the shaft and its other end secured at 159 to the shaft. Collar 158 has a slot 160 shown in Fig. 11 in which is a screw 161 entering the shaft 150. Extending from this collar 158 is an arm 163, pressed by a spring 164 against a cam 165, rigidly secured upon a shaft 166, which is journaled in suitable supports 167 carried by the frame of the machine. Shaft 167 carries a sprocket wheel 169 connected by chain 170 to sprocket pinion 171 mounted on the main power shaft 49 heretofore described. The power, thus transmitted, rotates the cam 163 which in turn, through collar 158 and spring 156, oscillates the shaft 150 and chute 148 when there is no clogging but if nuts clog the mechanism adjacent to the curved surface 136 so that the chute member 147 cannot be oscillated without breaking something the collar 158 oscillates backward and forward about the pin or screw 161 without oscillating the shaft 150 and consequently injury to the mechanism is avoided.

To keep the chute 146 clear of metallic shavings and other dirt coming thereto with nut blanks from the source of supply, pipe 173 enters said passageway and a hose or other suitable mechanism carrying compressed air may be attached to the pipe.

For the purpose of delivering nut blanks to the chute 146 and consequently through the other mechanism heretofore described to the tapping mechanisms, means which will now be described, are provided comprising a relatively elevated hopper 176 along one of whose sides is an inclined track 177 in line with the chute 146 but spaced therefrom by a gap 178 across which nut blanks sliding down the track 177 must jump to enter the chute 146. Below this gap 177 is a return passageway 180 through which any nuts which fail to jump the gap may return to the bottom 181 of the hopper. The hopper bottom is inclined downward toward the track 177, so that nut blanks placed in said hopper tend to flow toward the wall on which the inclined track 177 is mounted. At the lower end of the hopper, and adjacent to the track 177, upon a suitable shaft 183 carried by any convenient means from the frame of the machine, is an elevator wheel 184 in whose circumference are cut recesses 185 open at both sides of the wheel and inclined toward the track 177, so that as nut blanks slide down the bottom of the hopper they enter said recesses, and, as said wheel 184 is rotated, are carried up above track 177 onto which they slide and from which they jump the gap 178 and enter the chute 146 from which they pass to the tapping mechanism, as heretofore described. This shaft 183 is rotated by a belt 186 passing over a pulley 187 on the shaft 183, and another pulley 188 on the shaft 166, heretofore described.

In the complete operation of the machine, power is applied to the mechanism for rotating the taps 37 and the main power wheel 52. A considerable quantity of nut blanks are placed in the hopper 176 in which they gradually feed by gravity into contact with the wheel 184, and into the recesses 185 therein. The wheel elevates the nut blanks and drops them upon the inclined track 177. As long as everything is clear, they jump one at a time across the gap 178 into the chute 146. If things are not clear they return via the passageway 180 into the hopper without injuring the machine. The blanks in the passageway or chute 146 pass into the chute portion 148 of the switching member 147 and to a certain extent pass out through the openings 152 along the curved surface 136 and are carried by the oscillation of said switching member 147 and its attached sweeping members, 153 and 154 backward and forward across the upper ends of the chutes 135 leading to the different tapping mechanisms. If one chute 135 is full of nut blanks the switching mechanism simply carries its nut blanks to the adjacent chutes 135 which are not filled without injury to the machine. If all of said passageways 135 become full or otherwise clogged and there is a clogging of the whole machine at this point the power mechanism operating the shaft 150 continues to operate through the collar 158 without forcing the shaft 150 to operate and thus injure the machine. Nut blanks which are in the passageway or chute 135 leading to a particular tapping mechanism pass down said chute in the manner described. Assuming that the machine has been sufficiently operated so that there is a nut blank in position 81 to be tapped, and another one in the position 132 of Fig. 16 the forward movement of the rod 40 taps the first nut and the return stroke forces the nut in position 132 past the latch face 88 to proper position for tapping and delivers another nut to the position of 132 in the manner described. The tapping operation thus goes on just as long as nuts are supplied down the chute 135. As each nut is tapped it passes over the tap 37 onto the rod 36 where it remains until the rod is full when the operator (by means well known in the art) removes said rod from the machine and removes the tapped nuts from the rod. If for any reason it is not desired to operate all of the tapping mechanism together, which condition occurs whenever finished nuts are being removed from a rod 36, the operator moves the rod 69, 70 or 71 controlling the particular tapping mechanism which it is desired to stop and locks the same in stationary position by means of the latch 65 in the manner described.

By the construction here illustrated and described an entirely automatic machine is obtained which operates efficiently at high speed absolutely without injury to the machine through the clogging of nut blanks which necessarily occurs where a plurality of irregular shaped objects are together in small passageways.

I claim:

1. In a machine of the class described, in combination with a tool, a chuck or head, and means for bringing them into engagement with each other, a chute in said head leading down to a position opposite said tool, a plunger movable up and down in said chute, a source of nut blanks provided with an escapement dog adjacent to said chute, and a cam mechanism controlling the movement of said plunger in such a way that it presents nut blanks one at a time in said head in working position in front of said tool.

2. In a machine of the class described, in combination with a tool, a chuck or head, and means for bringing them into engagement with each other, a chute in said head leading down to a position opposite said tool, a movable locking means for securing a nut blank in the chute in position for work by said tool, a source of nut blanks provided with an escapement dog adjacent to said chute, and a cam mechanism controlling the movement of said locking mechanism in such a way that it presents nut blanks one at a time in said head in front of said tool.

3. In a machine of the class described, in combination with a tool, a nut holding head and means for bringing said head and tool into engagement, a passageway for nut blanks in said head, a plunger in said passageway, capable of forcing a nut blank into working position before said tool, a movable member connected to said plunger, a pivoted cam engaged by said member, means operated by a part moved in bringing the head and tool into engagement adapted to tilt said cam to different positions to cause said plunger to feed a nut blank into working position before the tool each time the tool and head are separated.

4. In a machine of the class described, the combination with a tool, a nut holding head, a mechanism for controlling a nut blank within the head adjacent to the tool, a member carried by said controlling mechanism, a pivoted cam normally in a given position adapted to have said member travel along a certain portion thereof while a nut is being worked upon by said tool, means for then causing said member to tilt said cam to a new position, means for locking said cam in the new position, whereby said member returns along the same part of the cam at an angle to its original position, means for then releasing said cam as the head reaches its original position, and means for returning said cam, the member thereon and attached parts to normal position, and means for moving the nut holding head toward and from the tool while said movements are taking place, for the purposes set forth.

5. In mechanism of the class described, in combination with a tool and mechanism for holding and feeding a nut blank upon said tool; a pivotally mounted cam having the faces 116 and 117, a member carried by the nut holding mechanism adapted to travel along the face 116 in a straight line, to then engage the face 117 and tilt the cam toward the nut holding mechanism, means for locking said cam in a new position while the nut holding mechanism is moved to original position, and means for then returning said cam and the parts controlled thereby to their original position.

6. In a machine of the class described the combination with a tool, nut holding means adjacent thereto, means for bringing said mechanisms into engagement with each other, a chute leading to said nut holding means, an escapement controlling said chute, a supplemental chute mounted upon the holding means adjacent to the first chute engaging said escapement mechanism, and means for moving said supplemental chute between tapping operations of the machine so that said supplemental chute operates said escapement mechanism to deliver nut blanks one at a time from the first chute through the supplemental chute to the holding mechanism, for the purposes set forth.

7. In a machine of the class described the combination with a tool, nut holding means adjacent thereto, means for bringing said mechanisms into engagement with each other, a chute leading to said nut holding means, an escapement mechanism controlling said chute, and mechanism mounted upon the holding mechanism automatically movable between tapping operations to operate said escapement mechanism and delivering a nut blank toward said holding mechanism, means for retaining said nut within the holding mechanism but out of tapping position while the next preceding nut is being tapped, and means for automatically then forcing said first mentioned nut blank into tapping position within the holding mechanism, for the purposes set forth.

8. In mechanism of the class described, a plurality of nut blank chutes, another chute capable of being supplied with nut blanks, a power driven switch chute mechanism for conveying nut blanks from the last mentioned chute to said first chutes, and yielding power mechanism for moving said switch mechanism, whereby said switch may be stopped without stopping the rest of the machine.

9. In a machine of the class described, in combination with several nut conveying chutes, another chute capable of being provided with a plurality of nut blanks, and a pivoted switch always in contact with the second chute adapted to be swung successively into communication with the first mentioned chutes.

10. In a machine of the class described in combination with a plurality of nut conveying chutes, a semi-circular surface in which each of said chutes end, another chute ending in the center of curvature of said circular surface and in substantially the same plane of said first chutes, a switching chute pivoted in the center of curvature of said circular surface always in connection with said last mentioned chute and adapted to be moved successively into communication with the first mentioned chutes, and means for oscillating said switching chutes backward and forward between different positions in communication with said first mentioned chutes.

11. In mechanism of the class described in combination with a plurality of nut conveying chutes, another chute capable of being supplied with nut blanks adjacent to the entrances of said first chute, a switching chute always in communication with the second chute adapted to deliver nut blanks successively to the first chute, an open space between the lower end of the switching chute and the entrances to the first chutes, a mechanism for brushing nut blanks which pass out of said opening backward and forward over the entrances to the first chutes, for the purposes described.

12. In mechanism of the class described, in combination with a plurality of nut conveying chutes, another chute capable of being supplied with nut blanks adjacent to the entrances of said first chute, a switching chute always in communication with the second chute adapted to deliver nut blanks successively to the first chute, there being an open space between the lower end of the switching chute and the entrances to the first chutes, substantially as described.

In witness whereof, I have hereunto subscribed my name in the presence of two witnesses.

CHARLES F. MESSINGER.

Witnesses:
 DWIGHT B. CHEEVER,
 HOWARD M. COX.